United States Patent
Choi et al.

(10) Patent No.: US 9,333,799 B2
(45) Date of Patent: May 10, 2016

(54) NON-PNEUMATIC TIRE WITH REINFORCING MEMBER HAVING PLATE WIRE STRUCTURE

(71) Applicant: HANKOOK TIRE CO., LTD., Seoul (KR)

(72) Inventors: Seok Ju Choi, Daejeon (KR); Hak Joo Kim, Daejeon (KR); Man Seop Kim, Daejeon (KR); Kil Ju Ko, Daejeon (KR); Ki Ho Kang, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 279 days.

(21) Appl. No.: 13/954,272

(22) Filed: Jul. 30, 2013

(65) Prior Publication Data
US 2014/0238561 A1    Aug. 28, 2014

(30) Foreign Application Priority Data

Feb. 28, 2013    (KR) .......................... 10-2013-0022174

(51) Int. Cl.
*B60C 7/16*    (2006.01)
*B60B 9/26*    (2006.01)
*B60C 7/18*    (2006.01)

(52) U.S. Cl.
CPC ... *B60B 9/26* (2013.01); *B60C 7/18* (2013.01); *B60C 2007/107* (2013.04); *B60C 2007/146* (2013.04)

(58) Field of Classification Search
CPC .................................. B60C 7/12; B60C 7/125
USPC .................................. 152/246, 323, 329, 301
See application file for complete search history.

(56) References Cited

U.S. PATENT DOCUMENTS

| | | | | |
|---|---|---|---|---|
| 2,620,844 | A * | 12/1952 | Lord | 152/326 |
| 4,832,098 | A * | 5/1989 | Palinkas et al. | 152/7 |
| 4,934,425 | A * | 6/1990 | Gajewski et al. | 152/323 |
| 4,945,962 | A * | 8/1990 | Pajtas | 152/7 |
| 5,042,544 | A * | 8/1991 | Dehasse | 152/302 |
| 5,265,659 | A * | 11/1993 | Pajtas et al. | 152/329 |
| 5,460,213 | A * | 10/1995 | Pajtas | 152/11 |
| 8,104,524 | B2 * | 1/2012 | Manesh et al. | 152/326 |
| 8,113,253 | B2 * | 2/2012 | Arakawa et al. | 152/246 |
| 8,176,957 | B2 * | 5/2012 | Manesh et al. | 152/326 |
| 8,555,941 | B2 * | 10/2013 | Perron et al. | 152/326 |

(Continued)

FOREIGN PATENT DOCUMENTS

| | | |
|---|---|---|
| JP | 2011-178308 | 9/2011 |
| JP | 2012-056375 | 3/2012 |

(Continued)

*Primary Examiner* — Jeffrey J Restifo
(74) *Attorney, Agent, or Firm* — Hamre, Schumann, Mueller & Larson, P.C.

(57) ABSTRACT

Disclosed herein is a non-pneumatic tire with a reinforcing member. The non-pneumatic tire includes a tread part which comes into contact with the ground, a rim part which is coupled to an axle, an outer annular band part which forms an interface with an inner surface of the tread part, an inner annular band part which forms an interface with the rim part, a spoke part which is disposed between the outer annular band part and the inner annular band part and functions as a support, a connector which connects spokes of the spoke part to each other, and a reinforcing member which has a plate wire structure. The non-pneumatic tire can effectively and sufficiently withstand the weight of a vehicle. Further, the performance of the tire is balanced with respect to the contact area, the displacement extent and the resistance to rolling.

7 Claims, 4 Drawing Sheets

(56) References Cited

U.S. PATENT DOCUMENTS

| | | | |
|---|---|---|---|
| D711,815 S * | 8/2014 | Abe et al. | D12/605 |
| 8,813,797 B2 * | 8/2014 | Anderson et al. | 152/41 |
| 8,851,131 B2 * | 10/2014 | Luchini et al. | 152/324 |
| D727,247 S * | 4/2015 | Martin et al. | D12/570 |
| D731,962 S * | 6/2015 | Martin et al. | D12/605 |
| 2005/0133133 A1 * | 6/2005 | Becker et al. | 152/323 |
| 2009/0283185 A1 * | 11/2009 | Manesh et al. | 152/11 |
| 2010/0108215 A1 * | 5/2010 | Palinkas et al. | 152/324 |
| 2010/0132865 A1 * | 6/2010 | Iwase et al. | 152/301 |
| 2010/0200131 A1 * | 8/2010 | Iwase et al. | 152/209.1 |
| 2010/0314014 A1 * | 12/2010 | Burns | 152/301 |
| 2011/0011506 A1 * | 1/2011 | Manesh et al. | 152/328 |
| 2011/0024008 A1 * | 2/2011 | Manesh et al. | 152/5 |
| 2011/0030866 A1 | 2/2011 | Fadel et al. | |
| 2011/0079335 A1 * | 4/2011 | Manesh et al. | 152/310 |
| 2011/0240193 A1 * | 10/2011 | Matsuda et al. | 152/246 |
| 2011/0248554 A1 * | 10/2011 | Chon et al. | 301/63.102 |
| 2012/0038206 A1 * | 2/2012 | Chadwick et al. | 301/37.23 |
| 2012/0038207 A1 * | 2/2012 | Williams et al. | 301/37.23 |
| 2012/0060991 A1 * | 3/2012 | Mun et al. | 152/323 |
| 2012/0067481 A1 | 3/2012 | Cron | |
| 2012/0216932 A1 * | 8/2012 | Cron et al. | 152/246 |
| 2012/0234444 A1 * | 9/2012 | Palinkas et al. | 152/246 |
| 2013/0240272 A1 * | 9/2013 | Gass et al. | 180/54.1 |
| 2013/0319591 A1 * | 12/2013 | Van De Wiele | 152/246 |
| 2014/0000777 A1 * | 1/2014 | Choi et al. | 152/246 |
| 2014/0062170 A1 * | 3/2014 | Martin et al. | 301/62 |
| 2014/0062171 A1 * | 3/2014 | Martin et al. | 301/62 |
| 2014/0191564 A1 * | 7/2014 | Gebeau | 301/37.101 |
| 2014/0217808 A1 * | 8/2014 | Chang | 301/63.101 |
| 2014/0238561 A1 * | 8/2014 | Choi et al. | 152/17 |
| 2014/0311643 A1 * | 10/2014 | Amstutz et al. | 152/310 |
| 2015/0034222 A1 * | 2/2015 | Martin et al. | 152/154.2 |
| 2015/0034225 A1 * | 2/2015 | Martin | 152/326 |
| 2015/0122382 A1 * | 5/2015 | Choi et al. | 152/17 |

FOREIGN PATENT DOCUMENTS

| | | |
|---|---|---|
| KR | 2004-0027984 | 4/2004 |
| KR | 2006-0051513 | 5/2006 |
| KR | 2008-0038274 | 5/2008 |
| KR | 2012-0049400 | 5/2012 |
| KR | 2012-0109658 | 10/2012 |
| WO | 03/018332 | 3/2003 |

* cited by examiner

NON-PNEUMATIC TIRE WITH REINFORCING MEMBER HAVING PLATE WIRE STRUCTURE

BACKGROUND OF THE INVENTION

1. Field of the Invention

The present invention relates generally to tires for vehicles and, more particularly, to a non-pneumatic tire which can provide handling performance similar to that of a pneumatic tire despite using no pneumatic pressure, and which can structurally withstand the weight of a vehicle.

2. Description of the Related Art

Generally, tires for vehicles are classified into radial tires, bias tires, solid tires, etc. according to the structure. Most vehicles, including passenger cars, with the exception of special purpose vehicles, use radial tires, that is, pneumatic tires. However, the structure of such a pneumatic tire is complex, and a comparatively large number of manufacturing processes, typically eight steps, is required. As a result of an increase in the number of manufacturing processes, a discharge amount of harmful substances is also increased. Furthermore, because the pneumatic pressure of the tire positively influences the performance and safety of the pneumatic tire, it must be frequently checked, thus inconveniencing a user in terms of maintenance. Moreover, there is the possibility of the tire being damaged by an external substance that may pierce the tire or apply an impact to it while the vehicle is moving.

Meanwhile, unlike the pneumatic tire, a non-pneumatic tire makes it possible to simplify the material and the manufacturing process, whereby the production cost can be markedly reduced. In addition, the non-pneumatic tire has an improved structure and can be manufactured by an improved process which can reduce energy consumption and the amount of harmful substances discharged. Above all, the non-pneumatic tire can avoid problems which may be caused by insufficient pneumatic pressure in the conventional tire. Furthermore, the non-pneumatic tire can prevent a standing wave phenomenon which occurs in the pneumatic tire. Moreover, the non-pneumatic tire can markedly improve characteristics of resistance to rolling.

The non-pneumatic tire has a completely different structure from the pneumatic tire. Unlike the pneumatic tire, because the non-pneumatic tire is configured such that no compressed air is used, there is no possibility of an accident occurring while the vehicle is moving that is attributable to a shortage of pneumatic pressure or a flat tire.

Such non-pneumatic tires have existed and been produced by conventional techniques. For example, wagon wheels or bicycle wheels were used many years ago. These days, a technique, in which a plurality of support members including multi-layered staples support the load of a tire, was proposed in Korean Patent Laid-open Publication No. 2006-0051513. Further, in a technique proposed in Korean Patent Laid-open Publication No. 2008-0038274, a non-pneumatic tire includes a main body which is made of elastic material, a circumferential-extending crown part which functions as a tread, and an extension sidewall which is coupled to the crown part. In addition, a non-pneumatic tire, which includes an annular band that supports the load of the tire, and a plurality of web spokes that supports the load between the tire and a wheel or a hub with tension, was proposed in Korean Patent Laid-open Publication No. 2004-0027984.

In the case of the non-pneumatic tire including the spokes, it was introduced that the load applied to the tire is supported by the tensile force of the spokes. In this case, a reinforcing member is provided between the web spokes and the tread that comes into contact with the ground so that it can support the weight of the vehicle and conduct the same function as pneumatic pressure in the pneumatic tire. For instance, a structural support type non-pneumatic wheel having a continuous loop reinforcement assembly was proposed in Korean Patent Application No. 2012-7023435. In this technique, a spiral-coiled reinforcing member was introduced.

However, the support force of the spiral-coiled reinforcing member of the conventional technique that supports the weight of the vehicle is limited. This causes many problems such as deterioration in handling performance, ride comfort and the durability of a web spoke part.

SUMMARY OF THE INVENTION

Accordingly, the present invention has been made keeping in mind the above problems occurring in the prior art, and an object of the present invention is to provide a non-pneumatic tire which is provided with a reinforcing member having a plate wire structure that can provide load support force much greater than that of the conventional coiled reinforcing member, thus making it possible for the tire to reliably support the weight of a vehicle, and which is configured such that the contact pressure and the contact area of the tire are maintained uniform, thus enhancing the durability of the web spoke part, and improving characteristics of resistance to rolling.

In order to accomplish the above object, the present invention provides a non-pneumatic tire, including: a tread part coming into contact with the ground; a rim part coupled to an axle; an outer annular band part forming an interface with an inner surface of the tread part; an inner annular band part forming an interface with the rim part; a spoke part disposed between the outer annular band part and the inner annular band part, the spoke part functioning as a support; and a connector connecting spokes of the spoke part to each other, wherein a reinforcing member having a plate wire structure is arranged in a circumferential direction in any one among the tread part, the outer annular band part and the inner annular band part.

In an embodiment of the non-pneumatic tire, the reinforcing member may be provided in each of at least two among the tread part, the outer annular band part and the inner annular band part.

In an embodiment of the non-pneumatic tire, the reinforcing member may include a plate wire which is a thin band and is wound several times spirally. The reinforcing member may be formed of a multi-layered structure, each of layer having a plate wire which is a thin band and is wound several times spirally.

In an embodiment of the non-pneumatic tire, the reinforcing member may be made of any one selected from the group consisting of metal, steel, carbon, aramid and glass fiber or a compound of them.

In an embodiment of the non-pneumatic tire, the reinforcing member may be configured such that a height thereof is greater than a width thereof or less than the width, and each of four angled corners of the reinforcing member may be rounded with a predetermined curvature radius. The reinforcing member may have a hollow structure.

In the non-pneumatic tire according to the present invention having the above-mentioned construction, because the reinforcing member having a plate wire structure is provided, the tire can effectively and sufficiently withstand the weight of a vehicle. Further, the performance of the tire is balanced with respect to the contact area, the displacement extent and the resistance to rolling, whereby the durability of a web sport part can be improved, and the ride comfort and the handling performance provided by the vehicle can be enhanced.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings. In the description of the present invention, explanation of general function or construction of the well-known technique related to the present invention will be omitted.

The present invention relates to a non-pneumatic tire which is provided with a reinforcing member having a plate wire structure, whereby the tire can more effectively withstand the weight of a vehicle, and the durability of a web spoke part, the ride comfort and the handling performance can be improved.

Figure 1A:
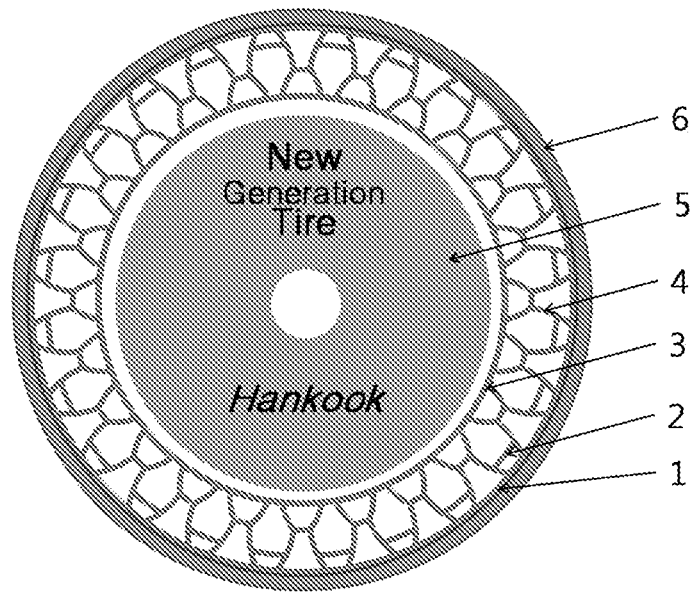
FIG. 1A is a view illustrating critical parts of a non-pneumatic tire, according to an embodiment of the present invention.

FIG. 1A is a view illustrating critical parts of a non-pneumatic tire, according to an embodiment of the present invention. Referring to FIG. 1A, the non-pneumatic tire according to the present invention includes a tread part 6 which has a predetermined width, comes into contact with the ground, and is associated with the transmission of power and the handling performance; a rim part 5 which is fitted over a hub of a vehicle to couple the tire thereto; an outer annular band part 1 which forms an interface with an inner surface of the tread part 6 and supports the tread part 6; an inner annular band part 3 which forms an interface with the rim part 5; a spoke part 4 which is disposed between the outer annular band part 1 and the inner annular band part 3 and functions as a support; and a connector 2 which connects spokes of the spoke part 4 to each other.

Figure 1B:
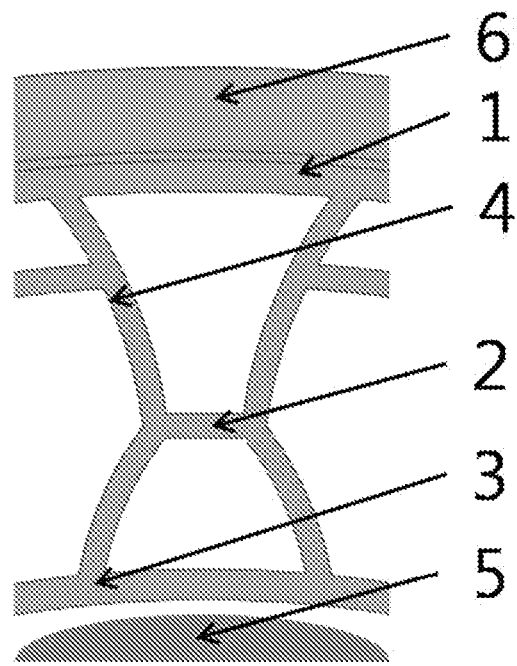
FIG. 1B is a view illustrating a section of the non-pneumatic tire in FEA (finite element analysis) of it, according to the embodiment of the present invention.

FIG. 1B is a view illustrating a section of the non-pneumatic tire of FIG. 1A. In this embodiment, twenty four sections illustrated in FIG. 1B are repeatedly arranged to form the non-pneumatic tire.

Figure 1C:
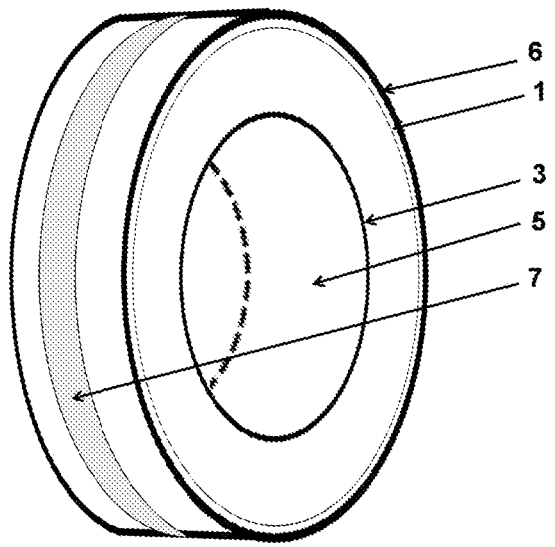
FIG. 1C is a conceptual perspective view of the non-pneumatic tire of FIG. 1A.

FIG. 1C is a conceptual perspective view of the non-pneumatic tire to illustrate an embodiment in which a reinforcing member 7 having a plate wire structure is provided in the tread part 6. Referring to FIG. 1C, the non-pneumatic tire according to the present invention is characterized in that the reinforcing member 7 having a plate wire structure is arranged in the tread part 6 in a circumferential direction of the tread part 6. Here, the term "in the tread part" refers to a portion between the outer surface and the inner surface of the tread part 6. The term "circumferential direction" means a direction in which the tire moves (FIG. 1C is a conceptual view showing the tread part from which the outer surface thereof has been removed).

In the non-pneumatic tire according to the embodiment of the present invention, the reinforcing member 7 may be arranged in either the outer annular band part or the inner annular band part in the circumferential direction. Alternatively, the reinforcing member 7 may be arranged in each of at least any two of the tread part, the outer annular band part and the inner annular band part.

Figure 1D:
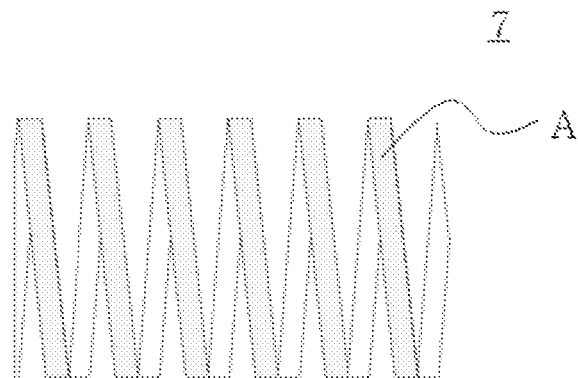
FIG. 1D is a conceptual view illustrating a reinforcing member having a plate wire structure, according to the embodiment of the present invention.
Figure 1E:
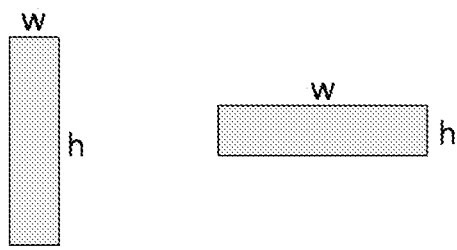
FIG. 1E is a conceptual view showing the specifications of the reinforcing member according to the embodiment of the present invention.

FIG. 1D is a conceptual view illustrating the reinforcing member 7 according to the embodiment of the present invention. FIG. 1E is a conceptual view showing the specifications of the reinforcing member (a sectional view perpendicular to circumferential direction).

Referring to FIGS. 1D and 1E, the reinforcing member 7 is formed in such a way that a plate wire A having a thin band shape is wound around many times spirally. The reinforcing member 7 may be formed of several layers, each of layer having a plate wire A wound around many times spirally.

Preferably, the width of the plate wire W having a thin band shape ranges from 1 mm to 100 mm, and the thickness (or height) thereof ranges from 1 mm to 20 mm. The reinforcing member 7 is made of any one selected from the group consisting of metal, steel, carbon, aramid and glass fiber or a compound thereof.

In the non-pneumatic tire according to the embodiment of the present invention, the reinforcing member 7 may be configured such that the height h thereof is greater than the width w or less than it. Furthermore, each of four angled corners of the reinforcing member 7 may be rounded with a predetermined curvature radius r. Moreover, the reinforcing member 7 may have a hollow structure.

Preferably, the width w of the reinforcing member 7 ranges from 0.1% to 95% of the width of the tire.

Figure 2:
FIG. 2 is a photograph showing the non-pneumatic tire according to the embodiment of the present invention.

FIG. 2 illustrates an image of the non-pneumatic tire according to the present invention. This drawing shows that the non-pneumatic tire can function as a tire without using the pneumatic pressure that is at the core of the performance of a pneumatic tire.

Figure 3:
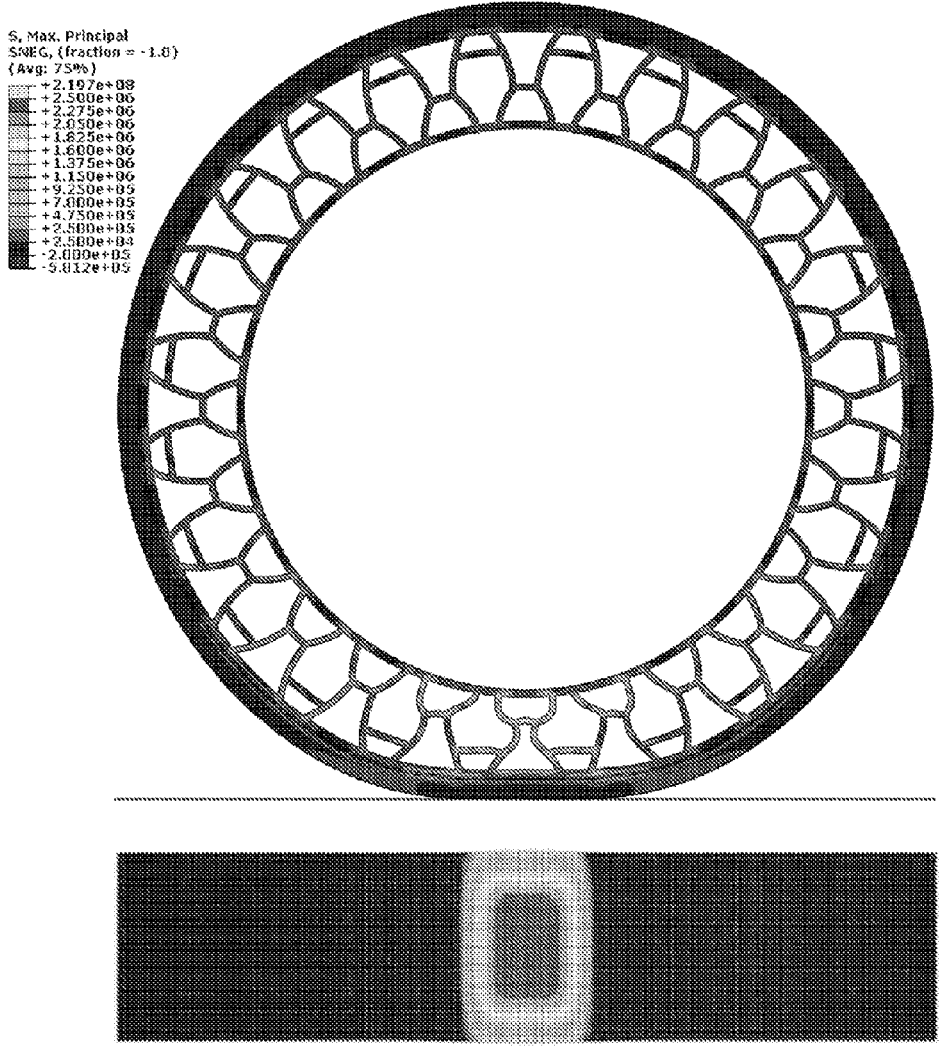
FIG. 3 is a view showing a contact contour of the non-pneumatic tire for evaluation of static characteristics of the non-pneumatic tire according to the embodiment of the present invention.

FIG. 3 is a view showing a contact contour of the non-pneumatic tire for evaluation of static characteristics of the non-pneumatic tire according to the embodiment of the present invention. As can be appreciated from FIG. 3, in the non-pneumatic tire according to the present invention, interference between spokes is not caused, and the contact contour of the non-pneumatic tire is similar to that of the typical pneumatic tire.

The following [Table 1] shows results of performance evaluation of static characteristics of tires having different reinforcing structures. Referring to [Table 1], it can be understood that the performance of the tire with the reinforcing member having a plate wire structure is superior in terms of a contact area, a displacement extent and resistance to rolling that is associated with fuel efficiency.

TABLE 1

|  | Reinforcing member in outer annular band part | | |
| --- | --- | --- | --- |
|  | None | Cord structure | Plate wire structure |
| Actual contact area (cm$^2$) | 83 | 56 | 51 |
| Displacement (mm) | 31 | 20.5 | 15.9 |
| Resistance to rolling (%, RRc, N/kN) | 100 | 113 | 130 |

As described above, a non-pneumatic tire according to the present invention is provided with a reinforcing member having a plate wire structure. Thus, the tire can effectively and sufficiently withstand the weight of a vehicle. Further, the performance of the tire is balanced with respect to the contact area, the displacement extent and the resistance to rolling, whereby the durability of a web sport part can be improved, and the ride comfort and the handling performance provided by the vehicle can be enhanced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A non-pneumatic tire, comprising:
   a tread part coming into contact with a ground surface;
   a rim part coupled to an axle;
   an outer annular band part forming an interface with an inner surface of the tread part;
   an inner annular band part forming an interface with the rim part;
   a spoke part disposed between the outer annular band part and the inner annular band part, the spoke part functioning as a support;
   a connector connecting spokes of the spoke part to each other; and
   a reinforcing member,
   wherein the reinforcing member comprises a plate wire wound a plurality of times spirally, and the plate wire has a thin band shape.

2. The non-pneumatic tire as set forth in claim 1, wherein the reinforcing member is arranged in the tread part in a circumferential direction of the tread part.

3. The non-pneumatic tire as set forth in claim 1, wherein the reinforcing member is arranged in the outer annular band part in a circumferential direction of the outer annular band part.

4. The non-pneumatic tire as set forth in claim 1, wherein the reinforcing member is arranged in the inner annular band part in a circumferential direction of the inner annular band part.

5. The non-pneumatic tire as set forth in claim 1, wherein the reinforcing member comprises a multi-layered structure, wherein each layer comprises a plate wire wound a plurality of times spirally, the plate wire having a thin band shape.

6. The non-pneumatic tire as set forth in claim 1, wherein the reinforcing member is made of any one selected from the group consisting of metal, steel, carbon, aramid and glass fiber or a compound of the metal, the steel, the carbon, the aramid and the glass fiber.

7. The non-pneumatic tire as set forth in claim 1, wherein the reinforcing member is configured such that a height thereof is greater than a width thereof or less than the width, and each of four angled corners of the reinforcing member is rounded with a predetermined curvature radius.

* * * * *